Sept. 30, 1941. R. S. BUTLER Re. 21,910

APPARATUS FOR REDUCTION

Original Filed Oct. 19, 1935 3 Sheets-Sheet 1

Inventor
Robert S. Butler
by Parker & Carter
Attorneys.

Sept. 30, 1941. R. S. BUTLER Re. 21,910

APPARATUS FOR REDUCTION

Original Filed Oct. 19, 1935 3 Sheets-Sheet 2

Inventor
Robert S. Butler
by Parker & Carter
Attorneys.

APPARATUS FOR REDUCTION
Original Filed Oct. 19, 1935 3 Sheets-Sheet 3
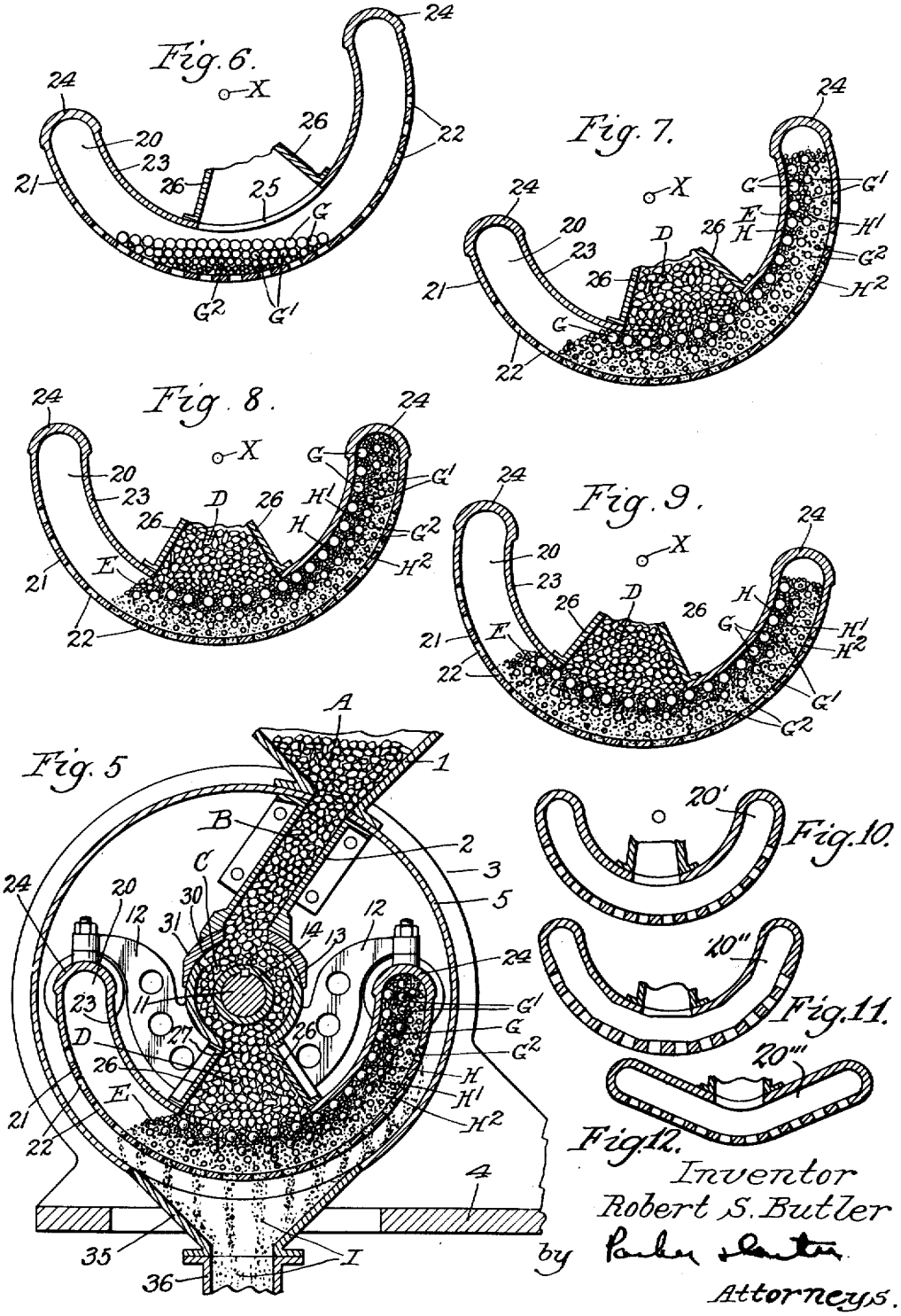

Reissued Sept. 30, 1941

Re. 21,910

UNITED STATES PATENT OFFICE 21,910

APPARATUS FOR REDUCTION

Robert S. Butler, Santa Monica, Calif., assignor to Sullivan Machinery Company, a corporation of Massachusetts Original No. 2,168,082, dated August 1, 1939, Serial No. 45,796, October 19, 1935. Application for reissue June 30, 1941, Serial No. 400,573

36 Claims. (Cl. 83—9)

This is an application for reissue of Letters Patent No. 2,168,082, granted August 1, 1939.

My invention relates to an apparatus for reducing or crushing materials, for example coal, ores and the like. Among the purposes of my invention are an increase in efficiency of reduction and a minimum use of power, a negligible use of power when the machine is running empty, and a continuous automatic feed whereby the mass undergoing reduction serves to control the admission of new particles to the zone of reduction to take the place of the reduced particles which escape therefrom. Another purpose is the provision of an apparatus in which the load undergoing reduction is, during the reducing cycle, subjected to substantially constant reducing stress or pressure. As an example, I oscillate or reciprocate a compact load of particles through a defined reducing zone, such zone being defined by an oscillated reduction chamber and including the space within the interior of the chamber at any instant and all the other space within the interior of the chamber in the various positions of the latter as it is moved in the course of its oscillation, and subject the load not merely to longitudinal reducing pressure at each change of direction of movement, but subject it to transverse reducing pressure intermediate said changes of movement. Another purpose is the provision of an improved reduction machine in which a reducing chamber and a feed passage thereto are unitarily oscillated or reciprocated, during the maintenance of a constant supply of new particles for reduction as the reduced particles escape from the device. Another purpose is the provision of improved feeding means for an oscillating reduction mill.

Other objects will appear from time to time in the course of the specification and claims.

The present application includes material divided from applications Nos. 759,902, filed on December 31, 1934, and 37,804, filed on August 26, 1935, copending with application Ser. No. 45,796, filed on October 19, 1935, which matured into Patent No. 2,168,082.

I illustrate my invention more or less diagrammatically in the accompanying drawings, wherein—

Figure 5 is a section corresponding to the section taken along the line 3—3 of Figure 1, with the material undergoing reduction and the reducing charge included, in order to indicate movement of the material in the course of the reducing method herein described;

Figure 6 is a vertical, radial section through a reducing chamber, showing the chamber empty except for a reducing charge;

Figure 7 is a similar section, illustrating the reducing chamber at the end of its travel toward the right, with the load moving toward the right just prior to the impact caused by the engagement of the load with the right end of the chamber;

Figure 8 is a similar view after the reducing chamber has reversed its direction and is moving toward the left, carrying the charge with it;

Figure 9 illustrates the reduction chamber moving toward the left, after its velocity has begun to decrease, and with the load moving away from the right end of the chamber and toward the left.

Figures 10, 11 and 12 are fragmentary sectional views showing modifications in chamber structure.

Like parts are indicated by like symbols throughout the specification and drawings.

Figure 1:
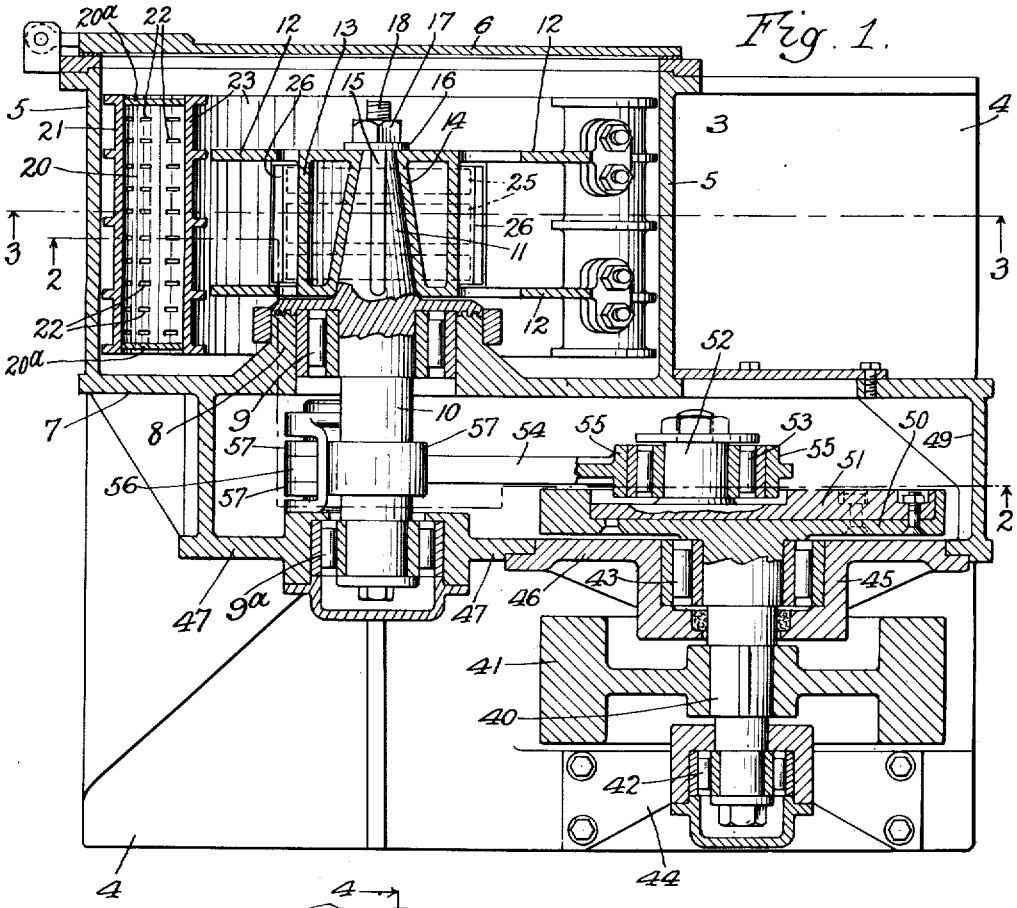
Figure 1 is a horizontal section on the line 1—1 of Figure 2.
Figure 2:
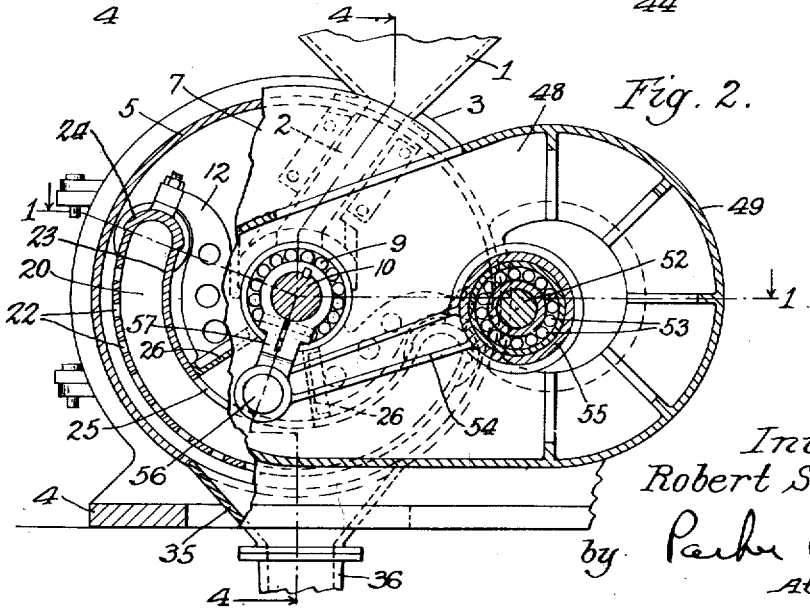
Figure 2 is a vertical section on the line 2—2 of Figure 1.
Figure 3:
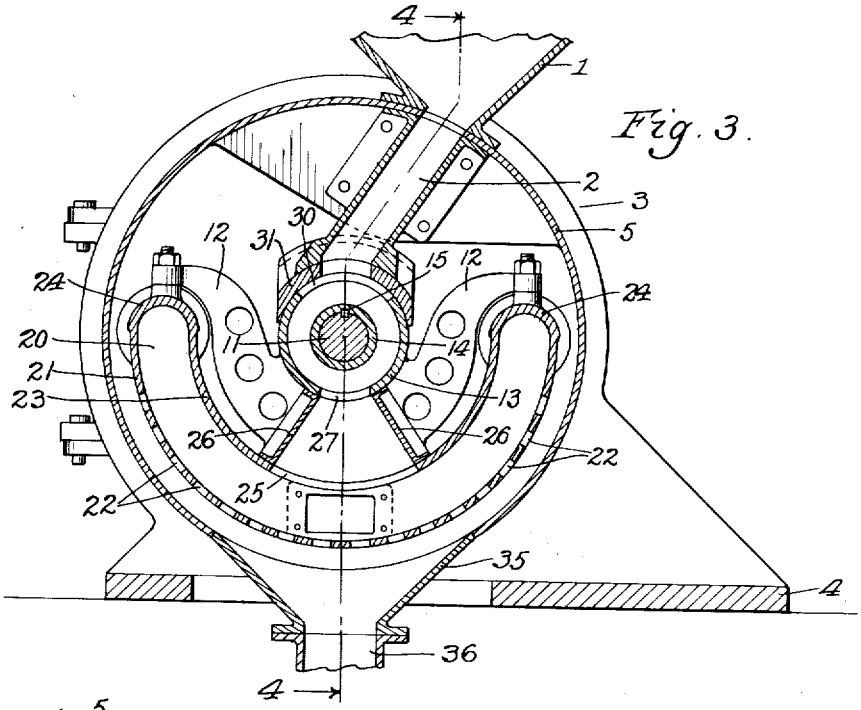
Figure 3 is a section on the line 3—3 of Figure 1.
Figure 4:
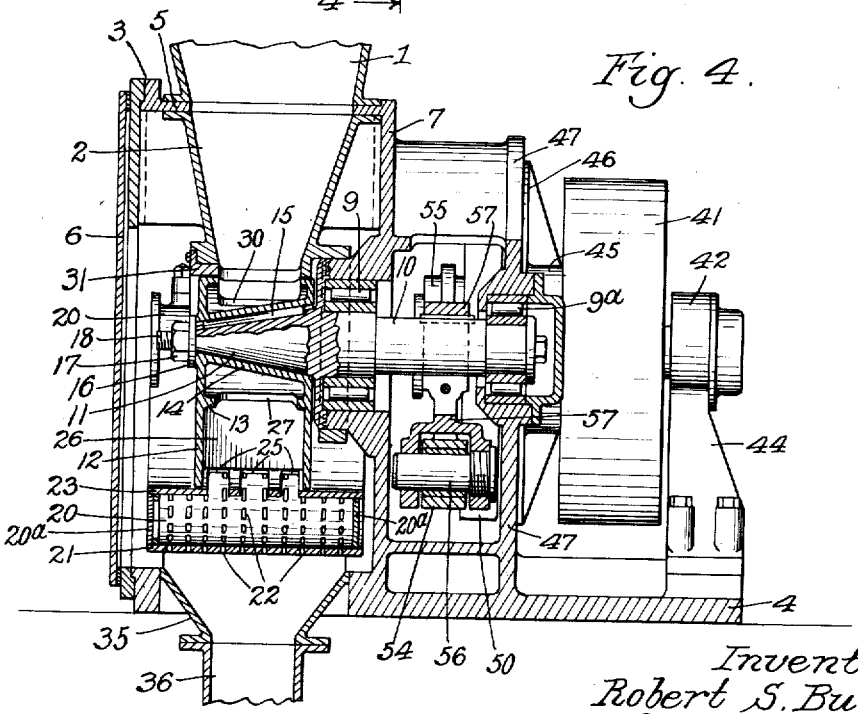
Figure 4 is a section on the line 4—4, indicated in both Figures 2 and 3.

Referring to the drawings, Figures 1 to 4 illustrate my improved reducing mill, and Figures 5 to 9 inclusive are primarily directed to illustrating the mode of operation or crushing method of the mill. Figures 10, 11 and 12 illustrate modifications.

Referring to the drawings, and considering first the movement of the material through my reduction mill, I illustrate, as at A in Figure 5, a mass of material awaiting crushing, which may be supplied in any suitable fashion to the hopper 1. It escapes thence along any suitable fixed chute 2, the material passing down this fixed chute or spout being indicated at B in Figure 5. This fixed spout 2 may be mounted in any suitable fashion in relation to the housing generally indicated as 3, which housing is mounted upon any suitable base 4 and is shown as having a circumferential cylindrical wall 5, an end wall or gate 6, and an opposite solid end wall 7, formed with the bearing supporting sleeve 8 which receives anti-frictional bearings 9 for the shaft 10 to which the below-described reduction chamber structure is secured. The shaft 10 is shown as provided with a tapered end 11 to which is secured what may be called a pendulum structure which includes the outwardly extending yoke or supports 12. Formed integrally therewith is the feed receiving sleeve or stirrup 13 which surrounds but is spaced outwardly from the tapered sleeve 14 which is keyed to and is locked against the tapered shaft portion 11, as by the key 15, washer 16 and nut 17 upon the screw-threaded extension 18 of the shaft 10.

Secured in any suitable fashion to the supports 12 is the reduction or reducing chamber proper, generally indicated as 20, which includes an outer arcuate wall 21 provided with apertures 22, an inner annular wall 23, and thickened end walls 24. The annular walls 21 and 23 are herein shown as concentric with the shaft 10, the common center being indicated at X in Figures 6 to 9 inclusive.

The inner or upper wall 23 of the reduction chamber is provided with feed apertures 25 at the outer end of a feed passage which is bounded on two sides by walls 26. The feed passage so formed communicates at its lower end directly with the reducing chamber 20 through the apertures 25 and at its upper end directly with the space between the sleeves 13 and 14 through an opening 27. It will be seen, as in Figures 3 and 5, that the outer sleeve 13 is open at its upper side, as at 30, this opening being masked by the arcuate shield or saddle 31 associated with the lower end of the feed spout 2. The outer sleeve 13 at its lower side has the opening 27 communicating through the feed passage with the apertures 25. It will be clear, as from Figure 5, that the mass of feed material B is in communication with, and rests upon the mass of feed material C within the sleeve 13. This in turn rests upon the mass of feed material D in the feed passage defined by the walls 26. By reason of the sweeping of the upper surface of material C, as the reduction chamber swings, back and forth beneath the lower end of the column of material B, there will be a size-reducing operation effected.

The load in the reduction chamber 20 is generally indicated as at E in Figures 5, 7, 8 and 9. The charge of reducing media, shown as stratified or classified, for reasons which will later appear, includes balls or particles of maximum size G, particles of intermediate size G—1 and particles of minimum size G2. These have associated with them, and work against, particles undergoing crushing of maximum size H, intermediate size H—1 and minimum size H2. The fully reduced particles escape through the apertures 22 in the lower or outer reduction chamber wall 21 and are indicated as at I, falling within the housing 5 and into the discharge hopper 35 which communicates with any suitable discharge spout or chute 36.

In the employment of the mill I impart a rotary oscillation to the reducing chamber 20 about the axis X of the shaft 10. This movement might be imparted to the reduction chamber in a variety of ways but I illustrate means for obtaining this oscillation, for example in Figures 1 to 4.

40 indicates a drive shaft which is keyed to the drive pulley 41, about which may pass any suitable belt, to a power source not herein shown. The shaft 40 may be supported for example in anti-frictional bearings 42 and 43. The bearings 42 are mounted on any suitable support 44, secured to the base 4. The bearings 43 are mounted in a sleeve 45, herein shown as formed integrally with a closure plate 46 secured in any suitable manner to the generally vertical housing wall 47 in which, also, the shaft 10 is rotatably mounted as by the bearings 9a. The oposite side of the housing so formed is closed, as by the wall 7 of the reduction chamber housing 5, which wall extends outwardly as at 48 and is connected to the wall 47 as by any suitable side and end wall structure 49.

Positioned within the housing so formed, and formed integrally with the end of the shaft 40, is a disc 50 to which is adjustably secured, for rotary adjustment, an inner inset disc 51. Outwardly projecting from this inset is the eccentric stud 52 surrounded by the anti-frictional bearings 53 which in turn are surrounded by the eye 55 of an oscillating arm or connecting rod 54. This arm is pivoted at its outer end as at 56 to a crank arm 57 secured to the shaft 10. It will therefore be understood that when the shaft 40 is rotated in response to any suitable driving connection, the discs 50 and 51 rotate and move the stud 52 through a circular path. This circular movement is converted, by means of the connecting rod 54 and arm 57, to a rotary oscillation of the shaft 10. This oscillation is in turn imparted to the reduction chamber 20, the feed passage extending thereto and the sleeve 13. The sliding connection between the sleeve 13 and the shield 31 maintains a continuous and uninterrupted connection with the mass of material A and B sliding from the hopper 1 down through the feed spout 2. Thus the reduction chamber may be continually oscillated without in any degree interrupting the feed of material thereto.

It will be realized that whereas I have described and shown a practical and operative device, nevertheless many changes may be made in the size, shape, number and disposition of parts without departing from the spirit of my invention. I therefore wish my description and drawings to be taken as in a broad sense illustrative and diagrammatic rather than limiting me to my precise showing.

The use and operation of my invention are as follows:

The broad outline of my invention, and the operation of my reduction mill, will readily be understood, for example in connection with Figures 5 to 9. The material to be reduced is fed from a hopper 1, through a fixed feed spout 2, to and through an oscillated sleeve 13, which in turn communicates with the oscillated feed passage bounded by the walls 26. From this passage the material passes directly to the reduction chamber 20.

The material through the entire line of feed follows a continuous path. The feed material A, B, in the fixed feed hopper and spout 1, 2, rests upon the material C in the oscillated sleeve 13, which is continuous with the mass D in the oscillated feed passage. This entire line or column of feed rests upon the top of the load E, and the load serves as the means for regulating the feed of new particles to take the place of the particles undergoing crushing, because the load, as is clear, for example from Figure 5, masks or underlies the bottom of the feed passage bounded by the walls 26.

In order to make the operation and characteristics of my mill clear, I will outline briefly, under various heads, the most important characteristics.

*Reciprocating a load of media and material.*— The oscillation or reciprocation of the reducing chamber 20 reciprocates a load which includes the particles to be reduced and particles of reducing media. The particles or balls of reducing media, G, G—1, G2, are scattered through the mass E of particles undergoing reduction, as shown in Figure 5. As the chamber 20 changes its direction of rotation, its right hand end 24 receives the impact of the load, and causes the load also to change its direction of movement. In Figure 7 the load is about to engage with the right hand end 24 of the chamber 20. In Figure 8 the load is being moved toward the left with the chamber. In Figure 9 the chamber has begun to slow down and the load is still moving to the left. It will continue to move to the left until it engages the left end 24 of the chamber. This engagement will force the load to move to the right, and this cycle of movement of the load continues as long as sufficient new particles are added to the load to maintain the process. The reduced particles I escape through the apertures 22 of the wall 21 and may pass from the hopper 35 and the discharge spout 36.

*Load confinement.*—The chamber 20, at its various positions in the course of its oscillation, defines a reduction zone which includes the interior of the chamber at all normal positions of the chamber. In this reduction zone an intermittent centrifugal thrust is maintained downwardly toward the bottom of the zone. The material travels from end to end of the zone with a periodic change in the direction of movement caused by the oscillation of the reduction chamber 20. The interior of the chamber proper may be described as a zone of restriction, which is moved through and contained in the larger reduction zone. The load as a whole is confined in close association with the walls of the chamber 20. It is essential for maximum efficiency, that the general motion of both the reducing media and the material undergoing reduction be confined to a path which conforms generally to the path of the load as a whole, that the particles undergoing reduction may be held in contact with the particles of the reducing medium. Wandering of the load or freedom of movement is destructive of efficiency and is prevented by maintaining the load as a relatively compact mass. The cross-section of the chamber 20 along the path of movement of the load is therefore desirably, for some purposes, uniform, and the cross-sectional area at least should be. so far as practicable, maintained substantially uniform. Since in the practice of the invention uneven wear of at least the outer chamber wall 21 may be anticipated, it will be appreciated that maintenance of an approximation of uniformity of cross-section and of cross-sectional area is all that can be expected. With the maintenance of cross-sectional area approximately uniform, the only displacements of the bounding surface of the load are those due to compression at the reversals of direction of the load and to centrifugal force. There is a permitted internal displacement going on all the time, because the constituents of the load are never at rest, but the cross-sectional area of the load as a whole approximates uniformity, and in the structures illustrated for use in the practice of the invention there may be, unless and until wear affects the situation, a maintenance of the cross-section substantially constant along the path of the load.

*The reducing action continues throughout the cycle.*—The reducing action is a compound one. It is not limited to the impact or pressure caused by the reversal of direction of the load at each reciprocation. It continues throughout the stroke in the form of radial or tangential pressure primarily against the bottom 21 of the chamber 20. In the particular structure shown in the present specification, this continuing reducing pressure or thrust results, for example, from the centrifugal action caused by the rotary oscillation of the chamber 20 about its axis. The time represented by the reversals of direction is only a fraction of a cycle, and to continue the reducing action throughout the stroke, something must be provided for the charge to work against. By employing an arcuate bottom 21, and by oscillating the chamber 20 as a whole about the center X, I compel the load to move as it were uphill whenever it moves in relation to the chamber. This causes a tangential thrust or pressure and thus we can say that the load is subjected to three different reducing actions. There is in the first place the radial centrifugal pressure of the load against the lower portion of the chamber 20. There is the tangential pressure caused by movement of the load in relation to the chamber 20, which causes the load to climb up the ends of the chamber. Finally, there is the impact or compression of the load against the chamber end. At all times, during the cycle of reduction, the load is being pressed against a reacting member which causes pressures to be set up within and on the load. It is probable that some 75 per cent of the capacity, in my mill, is produced by pressures operating between the actual reversals or terminal impacts. I find the employment of an arcuate bottom or chamber a convenient means for obtaining my result. The arc of the chamber need not coincide with the arc of travel of the chamber, as is indicated by the chamber 20' of Fig. 10 whose pivot, indicated by the small unnumbered circle, is below the center from which the arc of the chamber is swept and there is room for much variation in contour. While I prefer a chamber having curvilinear bottom and top walls, it is within the spirit of my invention to employ walls having parts at slight angles to each other, as indicated in the construction of chamber 20'' in Fig. 11; or to employ a chamber having upturned ends which need not be curvilinear, as illustrated by the construction of the chamber 20''' of Fig. 12.

*Stage reduction.*—A further advantage and effect of my mill, and one which contributes to the ready escape of the reduced particles from the chamber 20 through the apertures 22, is the inherent classifying action due to centrifugal force. All particles are thrust centrifugally toward the wall 21 during the intermediate portion of each stroke. The reversal of movement at the end of the stroke, with its interruption of the centrifugal and the tangential thrust above discussed, allows the particles to rearrange themselves. As the smaller particles are denser for a given volume than the larger, they tend to displace the larger particles toward the center, and to monopolize the periphery or exterior or bottom of the crushing zone, because their size permits readier outward penetration in a radial direction. This centrifugal force tends to drive and to hold every particle out as far from the center of rotation or oscillation as it can go. As will appear, for example in Figures 5 and 7, the fine particles G2 of the media and H2 of the work, crowd out against the wall 21. The intermediate sized particles G—1 of the media and H—1 of the work, occupy an intermediate zone or stratum. The largest particles G of the media and H of the work, are stratified at the top of the crushing zone. As reduction takes place, the finer particles sift or escape downwardly through the load and pass out through the apertures 22. The tendency of centrifugal force to move the smaller and denser particles to the periphery is made relatively easy by the continuous reversals of direction of the load as a whole, which favor the progressive reorganization of the particle structure of the load.

*Force feed, passage, and discharge.*—The intermittent centrifugal thrust upon the material undergoing crushing supplements the gravital movement of particles to the reduction zone, through the reduction zone, and out of the reduction zone, all in connection with the above described classification reduction. The centrifugal force acts on the material D between the passage walls 26 of the feed passage. This mass of material, which is under constant gravital thrust downwardly against the load, has its gravital thrust intermittently strengthened by a centrifugal thrust. It takes considerable force to drive the feed against the tightly packed mass of balls and particles of the load. When sufficient of the finer particles have escaped to shorten the load and to permit a slight unmasking of the feed aperture bounded by the walls 26, it takes force to drive the feed through this opening in the short time that it is uncovered at the ends of the stroke. This centrifugal action not merely contributes to the feeding thrust and to the carrying of the reduced particles through the load as a whole, but contributes to the tendency of the reduced particles at the bottom of the load to escape through the passages 22. As above pointed out, this centrifugal thrust would not be so effective if it were not discontinuous. Every reversal of direction of the load E, and of the feed mass D, permits rearrangement of particles and contributes radically to the efficiency of the centrifugal or tangential thrust. Their conjoint and successive action is an important feature of my invention, and contributes greatly to the efficiency of my mill.

*Self regulation of feed and volume.*—In my mill I provide a constant and self regulated feed. This is of vital importance, because, by using it, I avoid loss of efficiency by underfeeding, with no possible risk of overfeeding. The entire line of feed, including the bodies of material indicated at A, B, C and D in Figure 5, exerts a cumulative pressure upon, and body D actually rests in part upon, the top of the charge E. The material in the hopper 1 can be piled as high as the operator wishes. The passage 2 may be constantly choked and the entire mechanism run at so-called "choke feed." No matter how high the material may be piled in the hopper 1, there is no possibility of choking or overfeeding the reduction chamber 20. The load or chamber contents regulates the entrance rate at every instant. I obtain this result in part by employing a form of chamber such that the load fills the chamber cross-sectionally throughout the length of the load. My preferred way of obtaining this result is to employ a reduction chamber 20, the cross-sectional area of which approximates uniformity and which desirably is substantially constant throughout its length. The load E moves bodily back and forth along the chamber 20 without deformation of its bounding surface. The intake passage bounded by the walls 26 is of such length, and is so located that the load itself blocks the inlet when the load volume is at a predetermined maximum. This prevents the penetration of additional particles until sufficient reduced particles have been discharged to make room for such additional particles. The instant that enough particles have been discharged to permit the addition of new particles, such new particles are delivered into the charge from the waiting mass D, by gravital thrust or by the reinforcing centrifugal thrust.

*Avoidance of short circuit.*—Another advantage of my mill, effective in connection with the automatic feed control and the classified reduction above discussed is that it renders practically impossible the passage of unreduced particles through the reduction zone. Virtually all the material, admitted from the mass D must pass through the load and through the crushing media from top to bottom, before escaping from the apertures 22. The small part of the material that enters at either end of the load is caught by the oncoming edge of the load E and is pushed against the chamber wall or the chamber end or both. I maintain the rate of reciprocation or oscillation of the chamber so high that this end material cannot drop through the chamber 20 before the load as a whole, or the crushing medium, overtakes it. This is particularly the case, since the load as a whole is maintained relatively compact and solid, filling up the entire cross-sectional area of the chamber 20 throughout the length of the load. As a result of this prevention of "short circuiting" the size or quality of the product is independent of the frequency of oscillation. This is of importance, as freeing me of the necessity of closely adhering to an optimum speed, a matter of necessity in conventional ball and impact mills.

*Product size control.*—In my employment of a relatively confined or compact load, not only do the constituent particles have a generally fixed relation to each other, as they classify by size, but the same is true of their interstices. I provide sufficient movement within the charge itself to prevent stagnation and to make possible the passage of the particles through the charge. I obtain this result by my alternation of longitudinal and transverse reduction pressure. When the particles classify or stratify by size, as they do, as shown for example in Figure 5, the lower stratum composed of the small media particles G2 the small work particles H2, serves as a sizing bed because of the small size of the interstices between particles. Only particles small enough to pass through the interstices of this layer can escape through the apertures 22. Similarly, the higher strata of media and particles size or control the particles passing through to the lower part of the reduction zone. The product ultimately passing through the media is substantially uniform in size. And this size is controlled by the size of the media particles. The work particles of each stratum escape to a lower stratum as soon as they are reduced to a size substantially below the size of the media particles of that stratum. Therefore, by altering the size of the media, I can alter the size of the interstices, and control the size of the particles passing through and discharging from the load. All that is necessary in order to effect such a change, is to change the size of the media in the chamber 20.

*Pumping action.*—The form of my chamber 20 being such that the load fills it in cross-section, a pumping action is developed at each end of the chamber at each reciprocation of the load. The load acts like a piston within the cylinder-like chamber. This pumping action serves a two-fold purpose; first, in forcing out material which has been reduced to proper size, thus promoting discharge; and second, compressing air or other gas remaining in that portion of the chamber, which compression serves to take up some of the shock of contact.

*Power saving at no load.*—Inasmuch as the charge is of small volume in relation to the cubic content of the reduction chamber 20, as shown in Figure 6, and since, owing to the curvilinear shape of the chamber bottom 21, the charge tends to stay in the bottom of the chamber 20, out of contact with the ends 24, I am able to avoid any working contact between the media and the ends 24 of the chamber 20 when the chamber is running empty, or if the load falls below a predetermined minimum. In other words, with insufficient material present, the bottom of the chamber 20 will travel beneath the medium, but, the oscillation of the chamber will be insufficient to cause the reduced load to engage the chamber ends 24. The load is held by gravity in an intermediate or idle position. No reduction takes place, and no wear, other than the slight wear against the bottom 21. And, what is exceedingly important, no power is consumed except the frictional power of the mechanical system. But this "no load" operation involves no delay in the resumption of normal operation. When sufficient material enters to build up the load volume to a size where the ends of the chamber engage the load, action starts again, and reduction takes place and continues as long as enough material passes down between the inlet walls 26 to maintain a sufficient load in the chamber 20. This action is so sensitive, and so certain, that in practice I have been able to cause a mill to operate for a second or two on full load, followed by a second or two of no load. A change of a few cubic inches in chamber contents volume, at the critical point, is enough to throw the machine from full load to no load or from no load to full load, the period of building up or dropping off amounting only to a second or two. In the use of my invention the power consumption is more nearly proportioned to the work done than in any other mill or machine known to me. In practice the no load power consumption need not be over ten per cent of the full load power consumption.

While the feature just described has the distinct advantages pointed out, it will of course be understood that the volume of media may be varied at the will of the operator by adding or subtracting balls; and, in any event, the employment of my invention, in its broader aspects, is not dependent upon the employment of any particular or predetermined volume of media.

*The feeding arrangement.*—I find it desirable to feed my oscillating mill near the center of oscillation. The feed opening defined by the walls 26 has the same angular amplitude of movement as the chamber 20. But whereas the charge is reciprocated through a very substantial arc in the chamber 20, the material in the feed passage is constrained to a much smaller arc by the confining walls 26. The feed mass D, therein contained, is not permitted to agitate, and by plugging up the whole feed passage, prevents any unintended retrograde escape of particles from the charge E. It serves as a seal for the top of the chamber 20, and assists in maintaining the charge in its desired compact condition.

The shield 31 and the sleeve 13 are advantageous in maintaining a constant feeding connection. The opening is never closed or obstructed, even at the extreme ends of the stroke.

In causing the mass D to serve as a plug or seal for the inlet opening to the chamber 20 I find that employing tapered walls 26 is advantageous. There is no chance for material from the chamber 20 to escape when the mass of material D is present. In the event that this material is used up by underfeeding, the tapered sleeve 14 still serves as a baffle. The escape of balls or material is effectively prevented.

*The mechanics of my apparatus and method.*—In my opinion the major reduction I obtain results from the lateral thrust against the walls, and especially the bottom wall 21, of the chamber 20. Pressure on material being reduced is necessary for reduction, but pressure accompanied by movement is vastly more effective than pressure alone. I provide both to a high degree. The centrifugal or radial pressure is due to the partial rotative motion of the load about the axis of oscillation of the chamber 20. It results in a radial compression of the load, due to its mass, radius and velocity, which is greatest at each stroke when the other pressures below described are at a minimum. My second source of reduction is the inertial or longitudinal pressure developed by the reversal of the load due to the reversal in direction of movement of the chamber 20. It is not a mere impact, but is smoothed out and extended. Instead of moving my load, without choke or drag, between changes of direction, I subject it to a constant pressure intermediate its reversal of direction, as above described. I employ not merely the direct radial thrust or pressure above discussed, but the tangential thrust of the load when it moves in relation to the chamber. It tends to move rectilinearly or tangentially, but is constrained to follow the arc and not the tangent. This tangential thrust, which precedes the terminal impact, robs the terminal impact of some of its sharpness, and also returns to the power source some of the energy put into the mass during the acceleration. The changes in thrust resulting from the alternation between longitudinal or inertial pressure and transverse (radial or tangential) pressure, promote settling and limited movement in the mass without allowing the mass as a whole, or its constituent parts, to move freely about. Another contribution to longitudinal pressure results from my employment of a relatively long load, analogous to the effect of a long string of freight cars. The very length of the load increases the time during which the impact resulting from the reversal of direction is felt through the load as a whole.

By the employment of these various features I am able vastly to reduce power use and power costs, while increasing reduction efficiency. I am able to obtain very accurate sizing, and to vary my sizing at will. In my sizing and in my reduction results I am not closely limited to an optimum rate of oscillation.

It will be understood that whereas I have illustrated a mechanism in which the reduced particles pass down a hopper 35 to an outlet 36, any suitable means may be employed to return oversize particles, if any, for recrushing. It is thought to be unnecessary to illustrate a mechanism for this purpose, since elevators, conveyors and recirculating devices are well known in the art. I wish to make it clear, however, that my invention is not limited to single pass reduction, but is equally applicable to closed circuit reduction in which part or all of the discharged material is returned to the reduction chamber for further reduction.

It will be understood that when, in the claims, I specify that the reducing chamber is of uniform cross-sectional area from end to end, I am alluding to the ends 24 against which the load abuts and to the substantially constant distance separating the walls 21 and 23, and not to the side walls 20a.

And it will further be understood that whereas in the specification or claims I describe the reduction chamber as being substantially uniform or constant, or generally or approximately uniform in cross-section or in cross-sectional area, from end to end thereof, I wish such terms to be used with sufficient flexibility to include not only slight variations in cross-sectional area from point to point along the chamber, such as are inevitable under ordinary manufacturing conditions, but also variations in cross-sectional area resulting from inequality of wear, if any.

And whereas it is desirable that said chamber 20 be of generally constant cross-sectional area from end to end thereof, it will be understood that I consider it within the scope of my invention to permit slight variations in cross-sectional area to a degree insufficient to impede or change the character of the reduction which takes place in such chamber or to preclude the described operation of the chamber contents in regulating feed.

While I have in this application specifically described one form and three modifications which my invention may assume in practice, it will be understood that this form and these modifications have been shown for purposes of illustration and that the invention may be further modified and embodied in various other forms without departing from its spirit or the scope of the appended claims.

I claim:

1. In a mill, means providing a size-reducing chamber supported for movement back and forth, said size-reducing chamber elongated in its direction of back-and-forth movement, at least approximating uniformity in cross sectional area throughout the major portion of its length, provided with discharge means through which material of small enough size to go through the same may pass while the chamber is in motion, and having means for the introduction into said chamber during the operation of the mill of material to be processed, including a feed passage communicating with said chamber through an aperture intermediate the ends of the chamber in a wall which extends longitudinally of the latter, and means for moving said chamber back and forth, said chamber of such dimension between said aperture and the opposite surface of said chamber, said chamber and said aperture of such relative lengths and disposition and said chamber-moving means imparting to said chamber movement at such rate and of such amplitude, that during normal continuous size-reducing operation the chamber load will be reciprocated between the ends of the chamber as a substantially compact mass substantially filling the entire cross-section of the chamber throughout the major portion of its own length and sweeping across the feed aperture and controlling the ingress of material awaiting entrance to the chamber at said feed aperture, and coacting with said feed aperture to preclude the building up of the volume of the mass sufficiently to fill the chamber completely.

2. A mill as defined in claim 1, in which the feed aperture opens through the top wall of the chamber and in which the chamber, at least throughout the major portion of its length, at least approximates uniformity in cross section.

3. A mill as defined in claim 1, in which the size-reducing chamber is supported for arcuate movement and has its walls respectively nearest to and farthest from the axis of its arcuate movement arcuate, in which said chamber at least approximates uniformity in cross section throughout the major portion of its length on planes including its axis of arcuate movement, and in which the feed aperture lies in the wall nearest the axis of chamber movement.

4. A mill as defined in claim 1, in which the chamber is of a dimension longitudinally at least three times its dimension between the feed aperture and the opposite surface of the chamber, and in which said chamber is also of a dimension longitudinally at least three times the dimension of the feed aperture longitudinally of the chamber.

5. In a mill, means providing a size-reducing chamber supported for back-and-forth movement, said size-reducing chamber elongated in its direction of back-and-forth movement, approximating uniformity in cross sectional area throughout the major portion of its length, provided with discharge means for the elimination from the chamber contents during operation, of material below a predetermined size, and having feed ingress means between its ends having associated therewith supply means adapted to deliver material to said feed ingress means at a rate in excess of the size-reducing capacity of the mill, and means for moving said chamber back and forth, said chamber of such dimension normal to its path of movement, and said chamber-moving means imparting to said chamber movement at such rate, that the contents of said chamber are maintained substantially compact in a mass conforming to the cross section of said chamber, and said chamber and said feed ingress means of such lengths and relative disposition and said chamber-moving means imparting to said chamber such movement both as to velocity and amplitude that with material constantly maintained at said feed ingress means and awaiting entrance to said chamber the chamber contents are reciprocated between the ends of said chamber and maintained insufficient completely to fill the chamber but sufficient to maintain said chamber substantially filled in cross section at its central portion at all times.

6. In a reduction mill, a reduction chamber arcuate in vertical longitudinal section and at least approximating uniformity in transverse cross sectional area throughout substantially its full length from end to end, means for delivering to said chamber the material to be reduced, means for withdrawing from said chamber the reduced particles, and means for swinging said chamber about a transverse axis, the length and radial dimension of said chamber, its path of swing, and its speed of movement predetermined to maintain the chamber contents in a relatively compact mass, filling substantially the full cross sectional area of said chamber for more than half but less than the entire chamber length, in all of its various positions in said chamber, and to subject said chamber contents through movement by and relative to said chamber successively to radial, tangential and longitudinal pressure.

7. In an apparatus of the character described, an oscillating chamber having a curved internal bottom surface at least approximating in curvature an arc whose center coincides with the axis of oscillation of said chamber and having an upper bounding surface of at least approximately concentric curvature provided with a feed intake opening and having further abutment-providing ends, said chamber at all points between its ends at least approximating uniformity in dimension radially, said dimension materially less than the distance between the axis of chamber oscillation and the point most adjacent thereto in said curved internal bottom surface.

8. In a mill, a movably mounted size-reducing chamber supported for movement in opposite directions along a predetermined path, said chamber elongated and substantially arcuate in its planes of movement and of a uniform width internally throughout its length and of comparatively small but uniform dimension normal to its path of travel, means for introducing material into said chamber including a feed opening substantially midway between its ends, means for discharging processed material while said chamber is in motion, and means for moving said chamber oppositely along said path, the length of said chamber, its dimension normal to its path, the dimension of said feed opening longitudinally of said chamber and the rate and amplitude of movement of said chamber such that when said mill is operating at capacity during each movement of said chamber in one direction along its path the same is filled completely full throughout the central zone of its length while both ends thereof are empty, whereby the chamber contents control the feed.

9. In a reduction mill, a reducing chamber the cross sectional area of which at least approximates uniformity from end to end of the chamber, means for imparting rotary oscillation to said reducing chamber about a generally horizontal axis positioned above the reducing chamber, the upper and lower walls of the reducing chamber being at least approximately concentric and struck from said axis and further being of substantially equi-angular arcuate extent, a feed passage opening through the upper wall of said reducing chamber, and means for maintaining feed therethrough during the oscillation of the reducing chamber, the lower wall of the reducing chamber being apertured to permit the escape of the reduced particles.

10. In a mill, a size-reducing-chamber-providing member mounted for pivotal movement about a horizontal axis, means for imparting thereto rapidly alternated arcuate movements in opposite directions, said chamber-providing member having an arcuate chamber formed therein of an angle of arc materially greater than the angle of such arcuate movements, said chamber having end walls and longitudinally extending walls and of substantially uniform cross section, between said end walls, on radial planes, and said longitudinally extending walls including relatively closely spaced concentric inner and outer walls, the rate of chamber movement and the spacing of said concentric walls so predetermined that the chamber movements cause the chamber contents to contact the opposite ends of said chamber in alternation and concurrently to contact, with substantially equiangular extent, said inner and outer walls, during size-reduction.

11. In a mill, a size-reducing-chamber-providing member supported for arcuate movement about a substantially horizontal axis, and means for imparting thereto a rapid oscillation upon such axis, said member providing end walls and between the latter a size-reducing chamber of generally uniform cross sectional area at substantially all points between said end walls on planes including said horizontal axis, and having upwardly concave generally concentric upper and lower walls with a feed opening through the said upper wall adjacent the center thereof and with said walls so spaced radially that with said feed opening entirely closed by a level surface of chamber contents resting on the outer wall of said chamber said chamber still provides material room for the reciprocation therein of such contents.

12. In a mill, a size-reducing-chamber-providing member mounted for swinging movement upon a substantially horizontal axis and providing an arcuate chamber having end walls and at least approximately concentric inner and outer walls and at least approximating uniformity in cross sectional area on transverse planes normal to said concentric walls at substantially all points between said end walls and of such extent and curvature that a straight line connecting the central points in the ends of said chamber falls at its middle point above the central point in the curve of the inner wall of said chamber, means for supplying material to said chamber during oscillation thereof and for discharging processed material therefrom also during operation, and means for oscillating said member rapidly about its pivot through a path such that the central point in the curve of the inner wall of said chamber always lies below a horizontal plane including said horizontal axis, said chamber having the interior thereof clear from end to end thereof for the free movement along said outer wall, under movements imparted thereto by said end walls, of the chamber contents.

13. In a mill, means providing a size-reducing chamber supported for swinging movement, said size-reducing chamber elongated in its direction of swinging movement and having upturned portions at opposite sides of its center as viewed from the side, of at least approximately uniform cross sectional area throughout at least the major portion of its length, provided with discharge means for size-reduced material through which adequately small material may freely pass while said chamber is in motion, and having feed ingress means between its ends having associated therewith supply means adapted, while said chamber is in motion, to deliver material to said feed ingress means at a rate at least equal to the size-reducing capacity of the mill, said chamber having walls enclosing the same imperforate save for said discharge and feed ingress means, and means for oscillating said chamber through such an arc that its ends are both always higher than an intermediate portion, said chamber of approximately uniform dimension from end to end normal to its path of movement and of a length at least twice its dimension normal to its path of movement, and the ratio of chamber length to the length, longitudinally of said chamber, of said feed ingress means and the rate of chamber oscillation such that the chamber contents are reciprocated in a substantially compact mass within said chamber in contact with and sustaining the head of material in said supply means awaiting ingress to said chamber.

14. In combination, a support, a power-oscillated supporting element swingably mounted in depending relation on said support, and a milling chamber fixed to said supporting element for arcuate movement thereby, said milling chamber having concentric upper and lower walls with a feed opening in its upper wall in the longitudinal central portion thereof and with the end portions of said upper wall closed and with its lower wall traversed largely throughout its length with discharge openings, the ends of said chamber substantially diametrically opposite each other with reference to the arc of swing of said chamber and said chamber of generally uniform cross sectional area substantially throughout its length on planes including its center of curvature and of a radial dimension materially less than half the radius with which its bottom is formed.

15. In a mill, means providing a size-reducing chamber supported for oscillatory movement about a pivot, said size-reducing chamber elongated in its direction of oscillatory movement and having relatively high ends and a low median portion, approximating uniformity in cross sectional area throughout the major portion of its length, provided with discharge means for size-reduced material through which material of small enough size may pass while said chamber is in motion, and having feed ingress means between its ends having associated therewith supply means of a construction to deliver material to said feed ingress means at a rate in excess of the size-reducing capacity of the mill and under a centrifugal force as a result of the movement of said chamber, said chamber having walls enclosing the same imperforate save for said discharge and said feed ingress means, and means imparting such an oscillation to said chamber as to compact the chamber contents alternately against the chamber ends, leaving the other ends empty, and cause the same to exert a substantial centrifugal force against the outer wall of said chamber during transit from end to end thereof, said chamber of approximately uniform dimension from end to end normal to its path of movement and of a length beyond either end of said feed ingress means greater than said dimension normal to its path of movement.

16. In a mill, a chamber-forming member supported for oscillatory movement and providing an elongated, relatively shallow chamber having ends materially higher than its median portion when said chamber is in its mid position and adapted to contain during operation a load comprising mingled size-reducing media and material to be reduced in size and having its interior free from obstructions to the free movement of such load longitudinally within said chamber under forces imparted thereto by the chamber ends, means for imparting to said chamber-forming member rapidly-alternated opposite movements of a speed and amplitude to cause bodily movement of the chamber contents as a mass relative to the chamber, in frictional contact, under centrifugal force, with the lower wall of said chamber, and compacting of the chamber contents alternately at the opposite ends of the chamber and the occupancy of the space therein from top to bottom of said chamber throughout more than half but less than the entire length thereof, and a feed opening into said chamber across which the chamber contents sweep during movement relative to the chamber.

17. In a mill, means providing a size-reducing chamber supported for reciprocatory movement, said size-reducing chamber elongated in its direction of reciprocatory movement, of substantially uniform cross sectional area throughout its central and at least the major remaining portions of its length, provided with discharge means effective to discharge material small enough to pass therethrough, upon the attainment of such material thereto, while the chamber is in motion, having associated therewith supply means for material to be reduced, and having a feed opening between its ends with which said supply means communicates, and means for imparting to such chamber reciprocatory motion, said feed opening of such dimension longitudinally of said chamber relative to the overall chamber length, and said chamber reciprocating means imparting to said chamber motion of such amplitude and at such speed that the chamber contents are caused to move as a relatively compact mass alternately with, and between the ends of, said chamber and to assume and maintain a volume adequate at least to fill the space within said chamber at one end of said feed opening and also substantially the entire space opposite said feed opening while leaving a substantial unfilled space within said chamber, whereby with material constantly maintained at and awaiting admission through said feed opening, relative reciprocation between the chamber contents and said chamber takes place and the chamber contents regulate the introduction of new material.

18. In a mill, means providing a size-reducing chamber supported for reciprocatory movement, said size-reducing chamber elongated in its direction of reciprocatory movement, approximating uniformity in cross sectional area throughout the major portion of its length, provided with discharge means through which material of small enough size may pass while said chamber is in motion, and having feed ingress means between its ends having associated therewith supply means adapted to deliver, while said chamber is in motion, material to said feed ingress means at a rate in excess of the size-reducing capacity of the mill, and means for reciprocating said chamber, said chamber of such dimension between said feed ingress means and the opposite side of said chamber, said chamber and said feed ingress means of such relative lengths and disposition, and said chamber reciprocating means imparting to said chamber movement of such rate and amplitude that with material constantly maintained at said ingress means and awaiting ingress to said chamber the chamber contents are maintained automatically, while said mill is in operation, sufficiently less in volume than the volume of said chamber so that relative reciprocation between said contents and said chamber may take place, but yet adequate in volume to occupy at least one-half the overall length of said chamber throughout its entire cross section, during normal mill operation.

19. In a mill, a frame, a pendulum pivotally supported on said frame for oscillatory movement about a pivot and having an elongated size-reducing chamber therein of approximately semi-annular form disposed with its concave side towards said pivot, said pendulum further providing a feed passage opening into said chamber at a locus which is substantially equally spaced from the ends of said chamber and at the same distance as said chamber ends from said pivot, discharge means for size-reduced material along the wall of said chamber more remote from said pivot, a quantity of free size-reducing media in said chamber, and means for imparting to said chamber alternate opposite movements of an amplitude and at a velocity to throw the chamber contents back and forth between the chamber ends during normal size-reducing operation.

20. In a mill, means providing a size-reducing chamber supported for swinging movement, said size-reducing chamber elongated in its direction of swinging movement and having upturned portions at opposite sides of its center as viewed from the side whereby the ends of the chamber are materially higher than the highest part of the center thereof when said chamber is in mid position, said chamber further approximating uniformity in cross sectional area throughout the major portion of its length, provided with discharge means for size-reduced material through which adequately reduced material may freely pass while said chamber is in motion, and having feed ingress means between its ends having associated therewith supply means adapted to deliver material to said feed ingress means at a rate at least equal to the size-reducing capacity of the mill, said chamber having walls enclosing the same imperforate save for said discharge means and feed ingress means and being clear from end to end thereof for the free movement of its contents between its ends, and means for oscillating said chamber through such an arc that its ends are both always higher than an intermediate portion, said chamber of substantially uniform dimension from end to end normal to its path of movement and of a length a plurality of times its dimension normal to its path of movement.

21. In a mill, a chamber-forming member providing an elongated relatively shallow chamber having end walls and of like cross section substantially throughout its length between said end walls and adapted to contain during operation a load comprising mingled size-reducing media and material in process, means for imparting to said chamber-forming member rapidly-alternated opposite movements along a predetermined arc to which the chamber in said member generally conforms in curvature and of a speed and amplitude to cause bodily movement of the chamber contents as a mass relative to the chamber and packing of the chamber contents alternately against the opposite ends of the chamber while the opposite chamber ends are respectively empty, and maintenance of said chamber contents in a substantially compact mass at all times filling throughout its own length substantially the full chamber cross section, and means providing a feed supply connection having a feed-opening into said chamber in a position spaced from the ends of said chamber and covered by the chamber contents as the latter move between the chamber ends.

22. In a mill, means providing a reversely arcuately moved chamber generally arcuate in its planes of movement and approximating uniformity in cross section on planes including the axis of movement of such chamber at substantially all points between its end portions, having a feed connection terminating in an intake opening through a wall of said chamber, and a charge of free size-reducing media in said chamber, said size-reducing media and material admitted through said feed opening forming a mass moving as a whole from end to end of said chamber and traveling alternately back and forth across said opening while said mill is in operation and acting as a gate therefor.

23. In a reduction mill, a reducing chamber having concentric upper and lower arcuate walls and a cross sectional area which is substantially uniform from end to end, the ends of said reducing chamber being upwardly turned, a feed passage having communication with said reducing chamber through the upper wall of the latter at a point lower than the opposite extremities of said upper wall, the longitudinally opposite walls of said passage tapering upwardly and inwardly toward each other, said chamber having the upper walls of its upwardly turned ends each of at least as great extent as the length of the communication with said chamber of said feed passage, and means for unitarily swinging the reducing chamber and feed passage about a center adjacent the upper end of said feed passage and from which said chamber is materially spaced at all points.

24. In a reduction mill, a generally curvilinear reducing chamber mounted for oscillatory movement about a generally horizontal axis, the cross section of said chamber being substantially constant from end to end, the ends of said reducing chamber having a substantial upward extension, means for imparting rotary oscillation to said chamber about said axis, the bottom wall of said chamber being provided with apertures to permit the escape of reduced particles, a feed passage member extending upwardly from the upper wall of said chamber to a point adjacent the axis of rotation of the chamber, said reducing chamber closed at its top except for communication through said feed passage member, a fixed feed spout, and means including relatively oscillatable parts fixed respectively relative to said feed spout and to said feed passage member for maintaining a constant feed connection between said fixed feed spout and said feed passage during the rotary oscillation of said chamber.

25. A rocker including a barrel, a feed neck fixed to said barrel and in communication with the interior thereof, and an oscillating milling chamber fixed relative to and in communication with the interior of said feed neck, said barrel cut away at the upper portion thereof, a stationary saddle covering said barrel and in close adjacency thereto and having a feed opening therethrough registering with the cut-away portion of said barrel, and means for supplying material to said saddle for delivery through the feed opening thereof into said barrel and through said feed neck into said milling chamber.

26. In a mill, a saddle having a feed opening therethrough and means for supplying material to said opening, a barrel fitting said saddle and having material-conducting passage means therein communicating with said opening, a support member in rigid relation to said barrel and oscillatable therewith about the axis of said barrel and providing an elongated arcuate size-reducing chamber and a radial feed passage connecting said material-conducting passage means and the interior of said chamber, a charge of size-reducing media in said chamber, and means for imparting rapidly reversed, pivotal movement to said barrel and support member to effect a size-reducing process throughout said chamber, at the zone of communication of said feed passage with said chamber, and also adjacent the communication between said saddle and said barrel.

27. In a reduction mill, a reducing chamber mounted for oscillation about a generally horizontal axis, said reducing chamber conforming generally in curvature to an arc struck from a point in said axis, the cross section of said chamber being approximately constant from end to end, means for imparting to said chamber rotary oscillation about said axis, the outer wall of said chamber being provided with apertures to permit the escape of reduced particles, a feed passage member extending upwardly from the upper wall of said chamber, a sleeve associated with the upper end of said feed passage member, surrounding the axis of oscillation of the chamber, a fixed feed spout, a guard member associated therewith, in relatively rotary shielding relation with said sleeve, said guard member and sleeve being apertured in line with each other, the apertures of the sleeve and guard being of sufficient size and their relative movement such as to maintain a feed connection between said feed spout and said sleeve of constant cross sectional area.

28. In a reduction mill, an elongated reducing chamber having end walls and longitudinally extending top, bottom and side walls and of approximately uniform cross sectional area between the end portions thereof, means for feeding material thereto including a feed aperture in, and adjacent the central portion of, one of said longitudinally extending walls of said chamber, discharge apertures in another longitudinally extending wall of said chamber, the walls of said chamber imperforate save for said feed and discharge apertures, means for supporting said chamber for oscillation about an axis from which it depends, means for imparting a predetermined longitudinal bodily oscillation to said chamber about said axis, said chamber so formed that the end portions thereof are spaced from each other by less than the length of said chamber along its center line and the end portions of said chamber being upwardly extended relative to the central portion thereof to such a degree that during chamber oscillation the extremities of said chamber are both at all times higher than the lowest intermediate portion thereof, and a charge of free reducing media confined in said chamber by the walls thereof and movable bodily with and also relative to said chamber and insufficient in volume, in relation to the length of excursion of said chamber, to engage either of the chamber ends when the mill is running below a predetermined minimum load.

29. An oscillating size-reducing chamber having upwardly concave arcuate top and bottom walls and further having end walls which alternately engage the chamber contents once in each cycle during milling, said chamber containing a charge of freely movable size-reducing media all of which are free to move relative to each other in any direction except as restricted by the chamber walls and each other and whose most remote elements are spaced from each end of the chamber when the latter is stationary and in mid position, and means for moving said chamber in a path conforming in curvature to said bottom wall, the length arcuately of said bottom wall so exceeding the chamber movement that said media do not engage the end walls of said chamber when unaccompanied by material in said chamber, and means for introducing material into said chamber while the latter is in motion.

30. In a mill, a support, an element pivotally mounted on said support and oscillating like a pendulum rapidly during milling and having an arcuate chamber formed therein having inner and outer, at least approximately concentric walls whose curvature conforms approximately to arcs of circles struck from its axis of oscillatory movement and end walls alternately engaging the chamber contents, and a free charge of size-reducing media within said chamber comprising elements of widely varying size classified in strata during the oscillation of said chamber with the larger elements traveling on the shorter radii, and means for admitting and discharging material relative to said chamber during chamber oscillation arranged to provide for passage of material as its size is reduced through said strata.

31. In a reduction mill, an arcuate reducing chamber the cross sectional area of which at least approximates uniformity throughout the arcuate extent of the chamber, means for imparting rotary oscillation to said reducing chamber about a generally horizontal axis positioned above the lower portions of the reducing chamber, the upper and lower walls of the reducing chamber being at least approximately concentric and struck from said axis and further being of substantially equiangular arcuate extent, a feed passage opening through the upper wall of the central portion of said reducing chamber, and means for maintaining feed therethrough during oscillation of the reducing chamber, the reducing chamber being apertured in the lower wall thereof to permit the escape of the reduced particles, the ratio of the arcuate extent of said chamber to that of said feed passage and the rate and amplitude of chamber oscillation being such that the chamber contents are reciprocated in said chamber and during normal size-reducing motion are continuously maintained, at least adjacent the central portion of the opening of the feed passage into the chamber, in a compact mass occupying the full cross section of said chamber.

32. In a reduction mill, an arcuate reducing chamber the cross sectional area of which at least approximates uniformity throughout the arcuate extent thereof, means for imparting rotary oscillation to said reducing chamber about a generally horizontal axis positioned substantially at the center of curvature of the reducing chamber, the radially inner and outer walls of the reducing chamber being at least approximately concentric and struck from said axis and further being of substantially equal arcuate extent, a feed passage opening through the radially inner wall of said reducing chamber, and means for maintaining feed therethrough during the oscillation of the reducing chamber, the radially outer wall of the reducing chamber being apertured to permit the escape of the reduced particles.

33. In a reduction mill, an arcuate reducing chamber the cross sectional area of which at least approximates uniformity throughout the arcuate extent thereof, means for imparting rotary oscillation to said reducing chamber about a generally horizontal axis positioned substantially at the center of curvature of the reducing chamber, the radially inner and outer walls of the reducing chamber being at least approximately concentric and struck from said axis and further being of substantially equal arcuate extent whereby a load within said chamber is reciprocated upon chamber oscillation in a zone of reduction corresponding to a substantial portion of an annulus, a feed passage opening through the radially inner wall of said reducing chamber adjacent the portion thereof which is lowest when said chamber is in mid position with respect to its oscillatory movement, and means for maintaining feed therethrough during the oscillation of the reducing chamber, the radially outer wall of the reducing chamber being apertured to permit the escape of the reduced particles.

34. In a mill, means providing a size-reducing chamber supported for oscillatory movement for reciprocating a load therein, said size-reducing chamber being elongated in its direction of oscillatory movement and having upturned portions at opposite sides of its lowermost point as viewed from the side and in its oscillation providing an arcuate zone of reduction of greater arcuate extent than the load reciprocated therein, being of at least approximately uniform cross sectional area throughout at least the major portion of its arcuate extent, being provided with discharge means for size-reduced material through which adequately small material may freely pass while said chamber is in motion, and having feed ingress means between the ends of the zone of reduction and having associated therewith supply means adapted, while said chamber is in motion, to deliver material to said feed ingress means at a rate at least equal to the size-reducing capacity of the mill, said chamber having arcuate walls imperforate save for said discharge and feed ingress means, and means for oscillating said chamber through such an arc that both ends of said zone of reduction are always higher than an intermediate portion, said chamber being of approximately uniform dimension at substantially all points traversed by the load therein normal to its path of movement and being of an extent longitudinal of the zone of reduction at least twice its dimension normal to its path of movement, and the ratio of chamber length to the length, longitudinally of said chamber, of said feed ingress means and the rate of chamber oscillation being such that the chamber contents are reciprocated in a substantially compact mass within said chamber in contact with and underlying the head of material in said supply means awaiting ingress to said chamber.

35. In a mill, means providing a size-reducing chamber supported for oscillatory movement with respect to its axis, said size-reducing chamber being elongated in its direction of oscillatory movement and having upturned portions at opposite sides of its lowermost point as viewed from the side and in its oscillation providing a zone of reduction of greater lengthwise extent than the load reciprocated therein, being of at least approximately uniform cross sectional area throughout at least the major portion of its size-reducing extent, being provided in its wall remote from said axis with discharge means for size-reduced material through which adequately small material may freely pass while said chamber is in motion, and having feed ingress means in its wall toward said axis having associated therewith supply means adapted, while said chamber is in motion, to deliver material to said feed ingress means at a rate at least equal to the size-reducing capacity of the mill, said chamber having imperforate walls save for said discharge and feed ingress means, and means for oscillating said chamber about said axis through such an arc that the ends of said zone of reduction always are substantially higher than an intermediate portion thereof, said chamber being of approximately uniform dimension normal to its path of movement throughout the path of load movement therein and of an extent longitudinal of the zone of reduction at least twice its dimension normal to its path of movement, and the ratio of chamber length to the length, longitudinally of said chamber, of said feed ingress means and the rate of chamber oscillation being such that the chamber contents are reciprocated in a substantially compact mass within said chamber in contact with and underlying the head of material in said supply means awaiting ingress to said chamber.

36. In a mill, a movably mounted size-reducing chamber supported for movement in opposite directions in a predetermined arcuate path, said chamber being substantially arcuate in its planes of movement and being arcuately elongated and of a uniform width internally throughout its length and of comparatively small but uniform dimension normal to its path of travel, means for introducing material into said chamber including a feed opening substantially midway of the path of load movement therein, means for discharging processed material while said chamber is in motion, and means for moving said chamber oppositely in said path and about an axis located at the center of curvature of said arcuate chamber, the arcuate extent of said movement, the dimension of said chamber normal to its path of movement, the dimension of said feed opening along the arc of said chamber and the rate of movement of said chamber being such that when said mill is operating at capacity during each movement of said chamber in one direction along its path the same is filled completely full throughout the central zone of its arcuate extent while portions at both ends of said central zone are empty, whereby the chamber contents control the feed.

ROBERT S. BUTLER.

CERTIFICATE OF CORRECTION.

Reissue No. 21,910. September 30, 1941.

ROBERT S. BUTLER.

It is hereby certified that error appears in the printed specification of the above numbered patent requiring correction as follows: Page 3, first column, line 19, for the word "from" read --down--; and that the said Letters Patent should be read with this correction therein that the same may conform to the record of the case in the Patent Office.

Signed and sealed this 18th day of November, A. D. 1941.

Henry Van Arsdale,
Acting Commissioner of Patents.

(Seal)